United States Patent
Haughawout et al.

(10) Patent No.: US 9,137,473 B2
(45) Date of Patent: Sep. 15, 2015

(54) SYSTEM AND METHOD FOR INTERACTING WITH A PROGRAM GUIDE DISPLAYED ON A PORTABLE ELECTRONIC DEVICE

(75) Inventors: Joseph Lee Haughawout, Irvine, CA (US); Mauro Dresti, West Covina, CA (US); Sandro David Klein, Cypress, CA (US); Alex Louie, Los Angeles, CA (US); Han-Sheng Yuh, Walnut, CA (US); Steve LanPing Huang, Placentia, CA (US); Patrick H. Hayes, Mission Viejo, CA (US); Weidong William Wang, Tustin, CA (US)

(73) Assignee: UNIVERSAL ELECTRONICS INC., Santa Ana, CA (US)

( * ) Notice: Subject to any disclaimer, the term of this patent is extended or adjusted under 35 U.S.C. 154(b) by 487 days.

(21) Appl. No.: 12/327,875

(22) Filed: Dec. 4, 2008

(65) Prior Publication Data

US 2009/0113478 A1   Apr. 30, 2009

Related U.S. Application Data

(63) Continuation of application No. 10/287,389, filed on Nov. 4, 2002, now abandoned, which is a continuation-in-part of application No. 09/905,396, filed on Jul. 13, 2001, now Pat. No. 6,938,101.

(Continued)

(51) Int. Cl.
*H04N 5/44* (2011.01)
*H04N 5/445* (2011.01)
(Continued)

(52) U.S. Cl.
CPC .......... *H04N 5/4403* (2013.01); *G01C 21/3682* (2013.01); *G06F 3/0481* (2013.01);
(Continued)

(58) Field of Classification Search
CPC .................................................... H04N 5/4403
USPC ............... 725/38–61, 132, 140, 152; 348/734
See application file for complete search history.

(56) References Cited

U.S. PATENT DOCUMENTS

| 4,894,789 A | 1/1990 | Yee |
| 5,005,084 A | 4/1991 | Skinner |

(Continued)

FOREIGN PATENT DOCUMENTS

| EP | 0561435 A2 | 9/1993 |
| EP | 0967797 A2 | 12/1999 |

(Continued)

*Primary Examiner* — Jun Fei Zhong
(74) *Attorney, Agent, or Firm* — Greenberg Traurig, LLP

(57) ABSTRACT

A method for controlling the operation of a plurality of consumer electronic devices by displaying a plurality of broadcast channel identifiers each corresponding to a broadcast channel in a display of a controlling device adapted to command at least channel tuning operations of the plurality of consumer electronic devices. Input is accepted into the controlling device that functions to designate one of the plurality of broadcast channel identifiers and the controlling device uses the designation of the one of the plurality of broadcast channel identifiers to cause a transmission of a wireless signal from the controlling device to a one of the plurality of consumer electronic devices to thereby cause the one of the plurality of consumer electronic devices to tune to the broadcast channel corresponding to the designated one of the plurality of broadcast channel identifiers. A condition associated with at least one of the controlling device and the designated one of the plurality of broadcast channel identifiers functions to determine the one of the plurality of consumer electronic devices to which the wireless signal is transmitted.

26 Claims, 10 Drawing Sheets

Related U.S. Application Data

(60) Provisional application No. 60/344,020, filed on Dec. 20, 2001, provisional application No. 60/371,223, filed on Apr. 9, 2002, provisional application No. 60/374,556, filed on Apr. 22, 2002, provisional application No. 60/390,167, filed on Jun. 20, 2002, provisional application No. 60/334,774, filed on Nov. 20, 2001.

(51) Int. Cl.
*H04B 1/20* (2006.01)
*G01C 21/36* (2006.01)
*G06F 3/0481* (2013.01)
*G06F 3/0482* (2013.01)
*G06F 3/0485* (2013.01)
*G09B 29/10* (2006.01)
*H04N 21/438* (2011.01)
*H04N 21/482* (2011.01)

(52) U.S. Cl.
CPC ............ *G06F3/0482* (2013.01); *G06F 3/0485* (2013.01); *G09B 29/102* (2013.01); *H04B 1/202* (2013.01); *H04N 5/44582* (2013.01); *H04N 21/4383* (2013.01); *H04N 21/482* (2013.01); *G06F 2203/04806* (2013.01); *G08C 2201/92* (2013.01)

(56) References Cited

U.S. PATENT DOCUMENTS

| | | | |
|---|---|---|---|
| 5,293,357 A | 3/1994 | Hallenbeck | |
| 5,307,055 A | 4/1994 | Baskin et al. | |
| 5,410,326 A | 4/1995 | Goldstein | |
| 5,450,079 A * | 9/1995 | Dunaway | 341/23 |
| 5,565,888 A | 10/1996 | Selker | |
| 5,574,964 A | 11/1996 | Hamlin | |
| 5,630,119 A | 5/1997 | Aristides et al. | |
| 5,635,989 A | 6/1997 | Rothmuller | |
| 5,648,760 A | 7/1997 | Kumar | |
| 5,652,613 A | 7/1997 | Lazarus et al. | |
| 5,671,267 A | 9/1997 | August et al. | |
| 5,710,605 A | 1/1998 | Nelson | |
| 5,724,106 A | 3/1998 | Autry et al. | |
| 5,751,372 A | 5/1998 | Forson | |
| 5,754,348 A | 5/1998 | Soohoo | |
| 5,761,606 A | 6/1998 | Wolzien | |
| 5,793,438 A | 8/1998 | Bedard | |
| 5,801,787 A | 9/1998 | Schein et al. | |
| 5,828,419 A | 10/1998 | Bruette et al. | |
| 5,835,864 A | 11/1998 | Diehl et al. | |
| 5,838,775 A | 11/1998 | Montalbano | |
| 5,855,006 A | 12/1998 | Huemoeller et al. | |
| 5,900,875 A | 5/1999 | Haitani et al. | |
| 5,901,366 A | 5/1999 | Nakano et al. | |
| 5,915,026 A | 6/1999 | Mankovitz | |
| 5,956,025 A | 9/1999 | Goulden et al. | |
| 5,970,206 A | 10/1999 | Yuen et al. | |
| 5,974,222 A | 10/1999 | Yuen et al. | |
| 5,978,043 A | 11/1999 | Blonstein et al. | |
| 6,002,394 A | 12/1999 | Schein et al. | |
| 6,002,450 A | 12/1999 | Darbee et al. | |
| 6,018,372 A | 1/2000 | Etheredge | |
| 6,020,881 A * | 2/2000 | Naughton et al. | 715/740 |
| 6,028,599 A | 2/2000 | Yuen et al. | |
| 6,037,933 A | 3/2000 | Blonstein et al. | |
| 6,037,939 A | 3/2000 | Kashiwagi et al. | |
| 6,040,829 A | 3/2000 | Croy et al. | |
| 6,097,441 A | 8/2000 | Allport | |
| 6,104,334 A * | 8/2000 | Allport | 341/175 |
| 6,127,941 A | 10/2000 | Van Ryzin | |
| 6,130,726 A | 10/2000 | Darbee et al. | |
| 6,133,909 A | 10/2000 | Schein et al. | |
| 6,137,549 A | 10/2000 | Rasson et al. | |
| 6,151,059 A | 11/2000 | Schein et al. | |
| 6,172,674 B1 | 1/2001 | Etheredge | |
| 6,177,931 B1 | 1/2001 | Alexander et al. | |
| 6,195,589 B1 | 2/2001 | Ketcham | |
| 6,211,856 B1 | 4/2001 | Choi et al. | |
| 6,219,694 B1 | 4/2001 | Lazaridis et al. | |
| 6,256,019 B1 | 7/2001 | Allport | |
| 6,278,499 B1 | 8/2001 | Darbee et al. | |
| 6,285,357 B1 | 9/2001 | Kushiro et al. | |
| 6,341,374 B2 | 1/2002 | Schein et al. | |
| 6,369,840 B1 | 4/2002 | Barnett et al. | |
| 6,407,779 B1 | 6/2002 | Herz | |
| 6,408,435 B1 | 6/2002 | Sato | |
| 6,437,836 B1 * | 8/2002 | Huang et al. | 348/734 |
| 6,463,463 B1 | 10/2002 | Godfrey et al. | |
| 6,532,589 B1 | 3/2003 | Proehl et al. | |
| 6,563,430 B1 * | 5/2003 | Kemink et al. | 340/825.49 |
| 6,577,350 B1 | 6/2003 | Proehl et al. | |
| 6,597,374 B1 * | 7/2003 | Baker et al. | 715/717 |
| 6,636,273 B1 * | 10/2003 | Weber | 348/734 |
| 6,742,184 B1 | 5/2004 | Finseth et al. | |
| 6,978,472 B1 | 12/2005 | Nashida et al. | |
| 7,831,930 B2 * | 11/2010 | Dresti et al. | 715/835 |
| 2001/0042247 A1 | 11/2001 | Inoue | |
| 2002/0092023 A1 | 7/2002 | Kaizu et al. | |
| 2002/0122080 A1 | 9/2002 | Kunii et al. | |
| 2002/0154173 A1 | 10/2002 | Etgen et al. | |
| 2002/0184625 A1 | 12/2002 | Allport | |

FOREIGN PATENT DOCUMENTS

| | | |
|---|---|---|
| EP | 0987888 A1 | 3/2000 |
| EP | 1204275 A2 | 5/2002 |
| GB | 2343073 A | 4/2000 |
| WO | 00/21286 | 4/2000 |
| WO | 00/40016 | 7/2000 |
| WO | 00/58935 | 10/2000 |
| WO | 01/20572 A1 | 3/2001 |

* cited by examiner

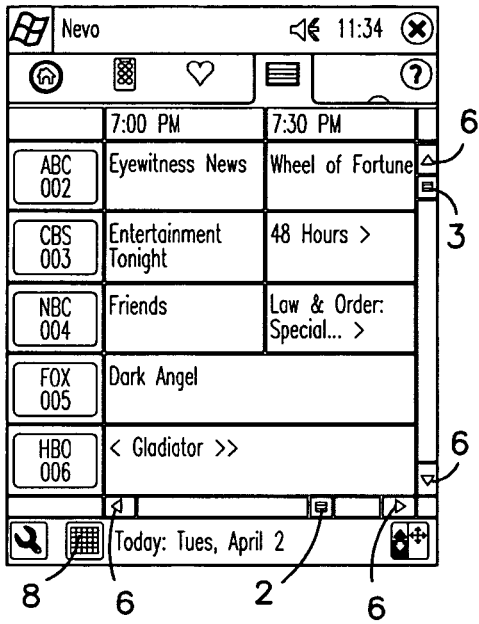
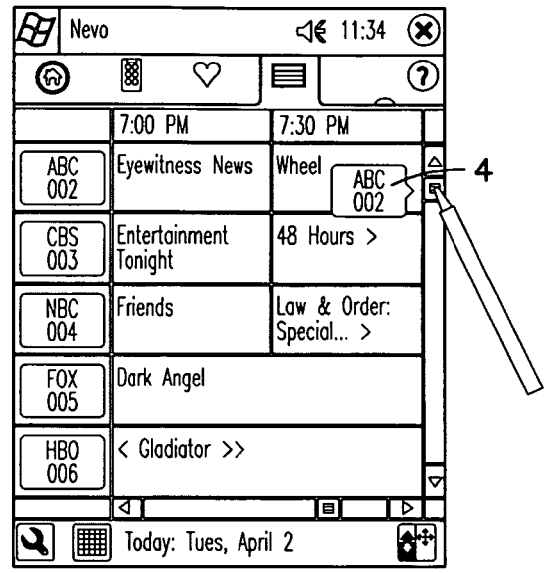
FIG. 1  FIG. 2
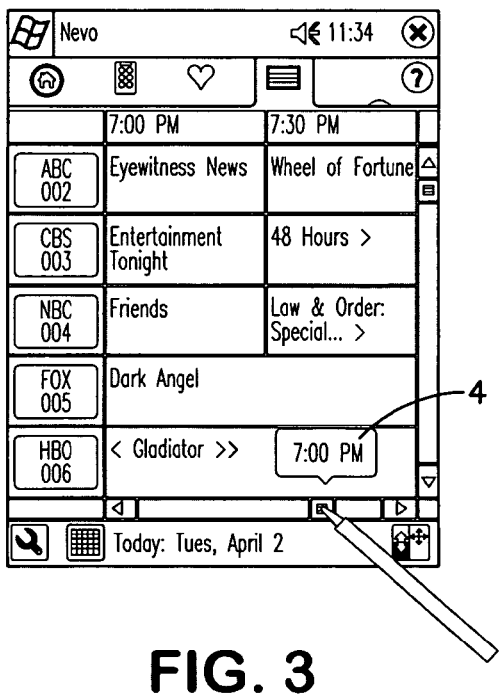
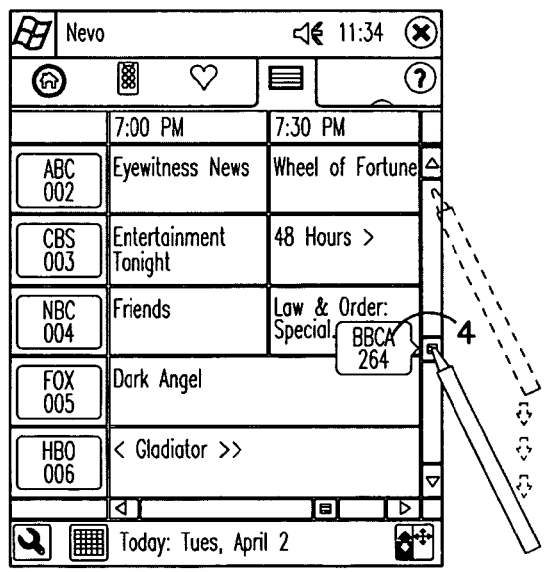
FIG. 3  FIG. 4

| | 10:00 am | 10:30 am | 11:00 am | 11:30 am | 12:00 pm | 12:30 pm | 1:00 pm | 1:30 pm |
|---|---|---|---|---|---|---|---|---|
| TLCP 72 | A Baby Story | A Baby Story | A Wedding Story | A Wedding Story | A Wedding Story | A Personal Story | A Personal Story | |
| ETVP 73 | Behind the Scenes | Celebrity Homes | The E! True Hollywood Story | | | | | |
| SCIFIP 74 | Sightings | | Dark Shadows | | Dark Shadows | Forever Knight | | |
| DHC 226 | Medical Diary | Life's Little Miracles | Birth Day | | Birth Day | Medical Diary | Medical Diary | |
| SCIENCE 227 | Lost Treasure of the Yangtze Valley | | Human: Who Are We? | | | The Ultimate Guide | | |
| DCHOME 231 | H & L Deluxe | | H & L Deluxe | | H & L Deluxe | Innovatrium | | |
| TECHTV 244 | The Screen Savers | | | | Big Thinkers | Call for Help | | |
| WTHRSCN 245 | < Weatherscan Local From the Weather Channel | | | | Weatherscan Local From the Weather Channel | | | |
| DCCIVL 253 | History Makers | | Titanic Voyage: Untold Stories | | | Marine Corps Boot Camp | | |
| DCWINGS 254 | Airport | A Plane is Born | Test Pilots | | | Free Fall | | |
| GOLDOLD 523 | Solid Gold Oldies | | | | | Solid Gold Oldies > | | |
| TDCNTRY 524 | Today's Country | | | | | Today's Country > | | |

Today: Tues, April 2

FIG. 7

| | 10:00 am | 10:30 am | 11:00 am | 11:30 am | 12:00 pm | 12:30 pm | 1:00 pm | 1:30 pm |
|---|---|---|---|---|---|---|---|---|
| TLCP 72 | A Baby Story | A Baby Story | A Wedding Story | | A Wedding Story | A Personal Story | A Personal Story | |
| ETVP 73 | Behind the Scenes | Celebrity Homes | The E! True Hollywood Story | | | | | |
| SCIFIP 74 | Sightings | | Dark Shadows | | Dark Shadows | Forever Knight | | |
| DHC 226 | Medical Diary | Life's Little Miracles | Birth Day | | Birth Day | Medical Diary | Medical Diary | |
| SCIENCE 227 | Lost Treasure of the Yangtze Valley | | Human: Who Are We? | | | The Ultimate Guide | | |
| DCHOME 231 | H & L Deluxe | H & L Deluxe | H & L Deluxe | | H & L Deluxe | Innovatrium | | |
| TECHTV 244 | The Screen Savers | | | | Big Thinkers | Call for Help | | |
| WTHRSCN 245 | < Weatherscan Local From the Weather Channel | | | | | Weatherscan Local From the Weather Channel | | |
| DCCIVIL 253 | History Makers | | Titanic Voyage: Untold Stories | | | Marine Corps Boot Camp | | |
| DCWINGS 254 | Airport | A Plane is Born | Test Pilots | | | | | |
| GOLDOLD 523 | Solid Gold Oldies | | | | | Free Fall | Solid Gold Oldies > | |
| TDCNTRY 524 | Today's Country | | | | | | Today's Country > | |

Today: Tues, April 2

FIG. 8

SYSTEM AND METHOD FOR INTERACTING WITH A PROGRAM GUIDE DISPLAYED ON A PORTABLE ELECTRONIC DEVICE

RELATED APPLICATION INFORMATION

This application is a continuation of U.S. application Ser. No. 10/287,389, filed on Nov. 4, 2002, which, in turn, claims the benefit of U.S. Provisional Patent Application Nos. 60/334,774 filed on Nov. 20, 2001, 60/344,020 filed on Dec. 20, 2001, 60/371,223 filed on Apr. 9, 2002, 60/374,556 filed on Apr. 22, 2002, and 60/390,167, filed on Jun. 20, 2002.

Through U.S. application Ser. No. 10/287,389, this application also claims the benefit of and is a continuation-in-part of U.S. patent application Ser. No. 09/905,396.

All of these prior applications are incorporated herein by reference in their entirety.

BACKGROUND OF THE INVENTION

This invention generally relates to portable electronic devices having a display and communication capabilities. Exemplary devices include personal digital assistants ("PDAs"), Web Tablets, touch screen remote controls, lap-top computers, and the like.

SUMMARY OF THE INVENTION

In accordance with the description that follows, a system and method is provided for navigating a program guide and/or for using a program guide to command operation of an appliance. An understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which:

FIGS. 1-4 illustrate an exemplary program guide and an exemplary system for navigating within the program guide;

FIGS. 7-11 illustrates exemplary methods for accessing an illustrated, exemplary zoomed-in portion of a program guide;

DETAILED DESCRIPTION

Figure 5:
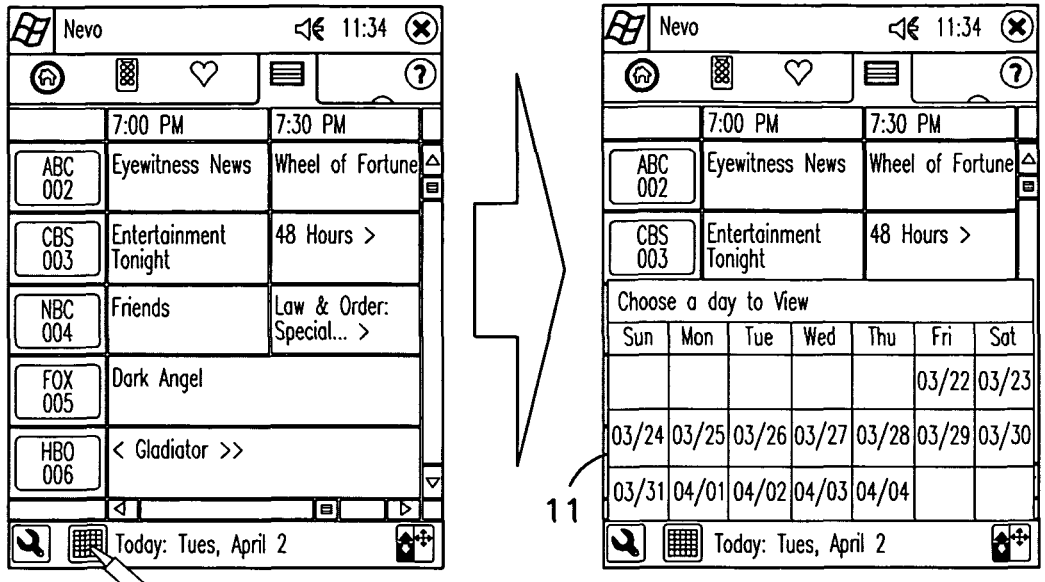
FIG. 5 illustrates an exemplary method for accessing an illustrated, exemplary program guide calendar.
Figure 6:
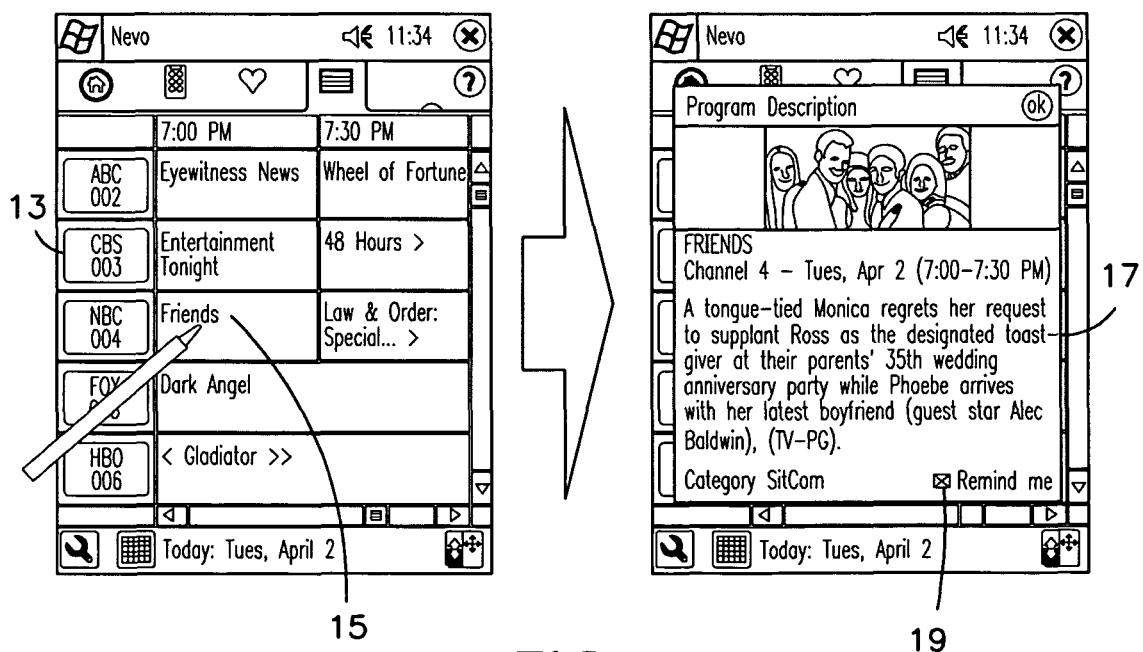
FIG. 6 illustrates an exemplary method for accessing an illustrated, exemplary program information window.

A universal remote control and program guide application are provided for executing on a portable electronic device 10. By way of example, representative platforms for the device 10 include, but are not limited to, devices such as remote controls, lap-top computers, Web Tablets and/or PDAs manufactured by HP/Compaq (such as the iPAQ brand PDA), Palm, Visor, Sony, etc. Thus, a preferred underlying platform includes a processor coupled to a memory system comprising a combination of ROM memory, non-volatile read/write memory, and RAM memory (a memory system); a key matrix in the form of physical buttons; an internal clock and timer; a transmission circuit; a power supply; a touch screen display to provide visible feedback to and accept input from a consumer; and I/O circuitry for allowing the device to exchange communications with an external computer such as server and/or client. Additional input circuitry, such as a barcode reader, may also be utilized.

To control the operation of the device 10, the memory system includes executable instructions that are intended to be executed by the processor. In this manner, the processor may be programmed to control the various electronic components within the device 10, e.g., to monitor power, to cause the transmission of signals, etc. Within the memory system, the ROM portion of memory is preferably used to store fixed programming and data that remains unchanged for the life of the product. The nonvolatile read/write memory, which may be FLASH, EEPROM, battery-backed up RAM, "Smart Card," memory stick, or the like, is preferably provided to store consumer entered setup data and parameters, downloaded data, etc., as necessary. RAM memory may be used by the processor for working storage as well as to hold data items which, by virtue of being backed up or duplicated on an external computer (for example, a client device) are not required to survive loss of battery power. While the described memory system comprises all three classes of memory, it will be appreciated that, in general, the memory system can be comprised of any type of computer-readable media, such as ROM, RAM, SRAM, FLASH, EEPROM, or the like in combination. Preferably, however, at least part of the memory system should be non-volatile or battery backed such that basic setup parameters and operating features will survive loss of battery power. In addition, such memories may take the form of a chip, a hard disk, a magnetic disk, and/or an optical disk without limitation.

For commanding the operation of appliances of different makes, models, and types, the memory system may also include a command code library. The command code library is comprised of a plurality of command codes that may be transmitted from the device 10 under the direction of application(s) for the purpose of controlling the operation of an appliance. The memory system may also includes instructions which the processor uses in connection with the transmission circuit to cause the command codes to be transmitted in a format recognized by an identified appliance. While the transmission circuit preferably utilizes infrared transmissions, it will be appreciated that other forms of wired or wireless transmissions, such as radio frequency, may also be used.

To identify appliances by type and make (and sometimes model) such that application(s) of the device 10 are adapted to cause the transmission of command codes in the format appropriate for such identified appliances, information may be entered into the device 10. Since methods for setting up an application to cause the transmissions of commands to control the operation of specific appliances are well-known, they will not be described in greater detail herein. Nevertheless, for additional details pertaining to remote control setup, the reader may turn to U.S. Pat. Nos. 6,225,938, 4,623,887, 5,872,562, 5,614,906, 4,959,810, 4,774,511, and 4,703,359 which are incorporated herein by reference in their entirety.

To cause the device 10 to perform an action, the device 10 is adapted to be responsive to events, such as a sensed consumer interaction with one or more keys on the key matrix, a sensed consumer interaction with the touch screen display, or a sensed signal from an external source such as a remote computer. In response to an event, appropriate instructions within the memory system are executed. For example, when a hard or soft command key associated with a remote control application is activated on the device 10, the device 10 may read the command code corresponding to the activated command key from the memory system and transmit the command code to an appliance in a format recognizable by the appliance. It will be appreciated that the instructions within the memory system can be used not only to cause the transmission of command codes to appliances but also to perform local operations. While not limiting, local operations that may be performed by the device that are related to the remote control functionality include favorite channel setup, macro button setup, command function key relocation, etc. Examples of such local operations can be found in U.S. Pat. Nos. 5,481,256, 5,959,751, 6,014,092, which are incorporated herein by reference in their entirety.

As discussed, the platform of the device 10 preferably comprises a general purpose, processor system which is controllable by software. The software may include routines, programs, objects, components, and/or data structures that perform particular tasks that can be viewed as an operating system together with one or more applications. The operating system, such as the "Windows CE" brand operating system or the like, provides an underlying set of management and control functions which are utilized by applications to offer the consumer functions such as a calendar, address book, spreadsheet, notepad, Internet browsing, etc., as well as control of appliances. Thus, it is to be understood that applications in addition to or complimentary with the remote-control-like application can also be supported by the device 10 and, as such, in terms of the internal software architecture, the remote-control-like application may be but one of several possible applications which may co-exist within the device 10.

In terms of providing operating system functionality, it should also be understood that the demarcation between the device 10 and a host/client computer, described in greater detail hereinafter, may vary considerably from product to product. For example, at one extreme the device 10 may be nothing more than a slave display and input device in wireless communication with a computer that performs all computational functions. At the other extreme, the device 10 may be a fully-functional computer system in its own right complete with local mass storage. It is also to be appreciated that a hardware platform similar to that described above may be used in conjunction with a scaled-down operating system to provide remote control functionality only, i.e., as a standalone application. In all cases, however, the principles expressed herein remain the same.

To provide a means by which an consumer can interact with the device 10, the device 10 is preferably provided with software that implements a graphical user interface. The graphical user interface software may also provide access to additional software, such as a browser application, that is used to display information that may be received from an external computer. Such a graphical user interface system is described in pending U.S. application Ser. Nos. 09/905,396, 60/334,774, and 60/344,020 all of which are incorporated herein by reference in their entirety.

For simplifying the process of navigating a downloaded program guide, which would be comprised of a grip of channels, times, and program information, the device 10 utilizes a program guide interface that takes advantage of the touchscreen style display. In particular, the program guide interface is designed to overcome one of the more annoying aspects associated with presently known program guides which results when consumers attempt to step from one channel (or time) to another channel (or time) that is relatively far away within a program guide. In particular, to navigate within presently known program guides, the consumer must repetitively press a navigation key, such as up/down, page up/down, time +/−, day forward/back, etc. As will be appreciated, navigation in this manner becomes increasingly tedious and frustrating to consumers as the number of entries within the program guide expands (e.g., with the addition of digital cable channels, satellite channels, etc.).

To address this problem, the user interface of the device 10 provides a horizontal slider 2 and a vertical slider 3 that, as illustrated in FIG. 1, allows for ease of movement through channels and times that are contained within the program guide. When a slider 2/3 is first touched with a stylus, finger, or the like, (i.e., a first user input is received) a banner 4 pops up next to the slider 2/3. The banner 4 includes a representation that corresponds to the current position of the slider as illustrated in FIGS. 2 and 3. As will be appreciated, the current, relative position of the slider 2/3 within the slider bar is representative of the guide information currently being displayed relative to the entirety of information within a given program guide that is displayable.

When a slider 2/3 is moved, the information in the banner 4 is preferably, continuously updated to display the relative position of the slider 2/3 within the slider bar so as to provide an indication of the guide information that would be displayed relative to the entirety of information within a given program guide that is displayable should the slider 2/3 be released. For example, the banner 4 might indicate a channel corresponding to the current position of the slider 3 (e.g., channel program information that would be displayed at the top of the display as the starting point of the displayed information) or the banner 4 might indicate a time corresponding to the current position of the slider 2 (e.g., program information for a time period that would be displayed at a side of the display as the starting point of the displayed information). It is further preferred that the underlying information that is displayed not be changed as a slider 2/3 is moved until the slider 2/3 is released (e.g., the stylus is lifted off the slider as a second user input) as illustrated in FIG. 4. In this way a consumer that wishes to change the channel program information being viewed from, for example, CBS (channel 2) to BBC America (channel 264), need only grab the slider 3, move the slider 3 vertically until it shows "BBCA 264," and then release the slider 3. A similar approach applies to the time slider 2 which allows you to move the program guide display horizontally to any hour in the current day. It will be appreciated that the second user input that results in the changing of the displayed grid information may also require acts in addition to or in lieu of the user merely releasing the slider (e.g., a double tap of the slider, activation of another icon, etc.).

To accommodate consumers that who prefer the old way of navigating through the information in the program guide, the interface allows the consumer to tap the arrows 6 at the ends of each slider bar to move/scroll the information one logical page either vertically or horizontally. In the illustrated example, a logical page vertically would comprise 5 rows of channels and one logical page horizontally would comprise a one hour time period. When moving thorough the program guide grid in this manner, the position of the sliders 2/3 should be updated to reflect the current, relative information being displayed. During this procedure, it is not necessary for a banner 4 to be displayed.

To allow the consumer to change the time period for the entirety of the displayable program guide information, e.g., to change days, the interface may provide two options. First, if the time slider (e.g., horizontal slider 2) is moved all the way to its slider bar limit (e.g., the right which is illustrated as corresponding to 11:00 PM—i.e., the end of the current displayable information) and the arrow 6 on the slider bar adjacent to the limit is clicked, the guide information rolls over to the next time period (e.g., 00:00 AM) and the time slider is automatically repositioned to the start of the slider bar (e.g., the extreme left hand side). A similar procedure performed in the reverse direction would be utilized to change the program guide information that is displayable to an earlier time period.

Alternatively, the consumer may activate (i.e., touch) a "calendar" icon 8 which is illustrated at the bottom left of the display to the left of the date. When the calendar icon 8 is touched, a calendar display 11 can be caused to appear as illustrated in FIG. 5. The calendar display 11 allows two purposes to be served. First, the calendar display 11 allows the consumer to go directly to any day shown by simply selecting that day on the calendar. Second, the calendar display 11 can serve as an indication to the consumer of how many days worth of program guide information remains when, for example, the consumer needs to dock the device 10 and/or log onto a Web site in order to download guide information as described in pending application No. 60/390,286 that is incorporated herein by reference in its entirety. In the example shown in FIG. 5, the calendar display 11 informs the consumer that the guide information currently being displayed is for April $2^{nd}$, this indication being made by providing a distinct, coloring, shading, etc. to the date, for example. The calendar display 11 may further inform the consumer that the consumer last downloaded two weeks worth of guide data on March $22^{nd}$ and has not logged on/synchronized with the guide database since then, these dates being indicated by being labeled, for example. Thus, as illustrated, the consumer is informed that they only have two more days of current information left (April 3 and 4)—which is indicated by the days following April 4 being labeled and not being hi-lighted, for example. The consumer can navigate immediately to gain access to program guide information, i.e., the programming grid, for either of the hi-lighted days, April 3 or April 4 (or, for that matter, to any of the days already past) by selecting that data on the calendar page 11. Thus, it will be appreciated that the calendar page 11 functions as a visual gauge to display the amount of schedule information remaining and serves as a reminder that the consumer should refill this information.

Once the consumer has positioned the program guide to the desired time/channel information, touching a channel button 13 (e.g., the left column) can cause the device 10 to instruct an appliance to immediately switch to that channel (i.e., to send the IR command(s) to switch to that channel.) Furthermore, touching a program name 15, "Friends" in the example shown, can cause the display of additional information in a window 17, for example, regarding that program. When information for a program that is scheduled to air some time in the future is displayed, a "Remind me" checkbox 19, or other known GUI element, can also be presented to the consumer. Selecting this checkbox 19 can be used to cause a reminder to be automatically entered into a calendar application supported by the device 10.

Figure 9:
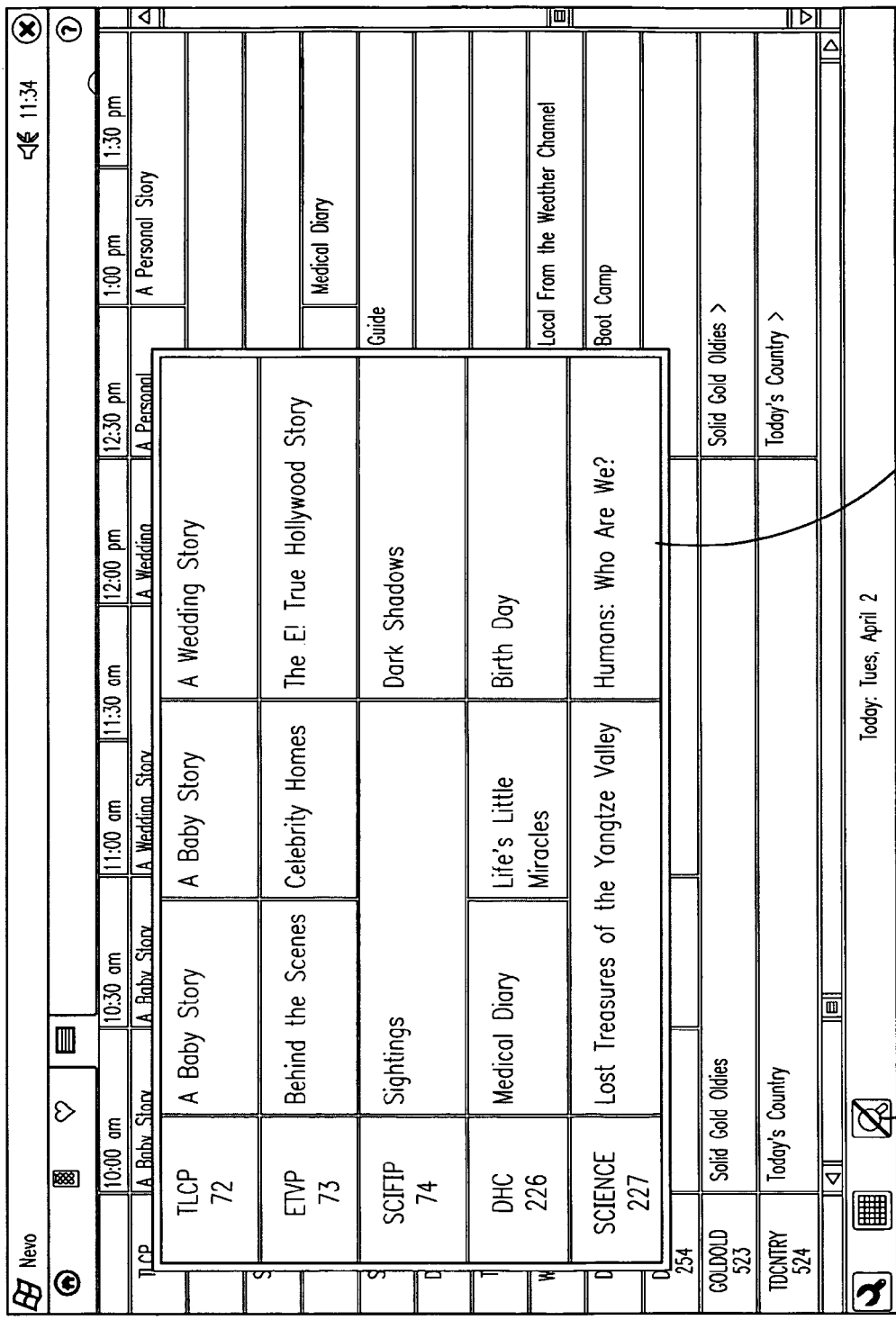

For improving the visibility of programming information contained within the program guide, particularly for consumers with imperfect eyesight, and/or on devices such as high-resolution Web tablets capable of displaying a large amount of information on a relatively small screen area, the device 10 can provide a means for accessing an enlarged or zoomed representation of a portion of the program guide. To this end, as illustrated in FIGS. 7 and 8, a "zoom" button 12 may be provided as a soft key at a convenient location within the display, for example, in the illustrated bottom of the display, adjacent the display as a hard key, etc. In response to an activation of the "zoom" button 12, e.g., by touching a softkey with a stylus 20, with a finger, moving a cursor over the icon and activating/clicking a hard key, etc. as illustrated in FIG. 8, an enlarged display 30 comprising a subgroup of the displayable program guide information is presented to the user, as illustrated in FIG. 9.

The portion of the program guide displayed as the enlarged portion 30 may be used to display a predetermined amount of programming information to the user (e.g., programming information related to a predetermined range of channels and/or predetermined time periods) or simply contain as much programming information as can be fit into the enlarged display based upon the font size, etc. selected for use in the zooming application. Furthermore, the specific programming information that is contained within the enlarged portion 30 of the program guide may also be predetermined (e.g., based only upon the portion of the program guide that is visible within the display prior to enlargement—see FIG. 7) or established using user-preferences. For example, the enlarged portion of the program guide 30 may comprise an enlarged view of programming information (i.e., programming grid cells) for a predetermined number of channels (in the illustrated example the number is 5) commencing from a predetermined starting channel number (in the example, the starting channel number "72" corresponds to the channel number that is at a predetermined position—such as at the top of the un-enlarged guide as illustrated in FIG. 7). Similarly, the enlarged portion of the program guide 30 may comprise an enlarged view of programming information for one or more channel listings over a predetermined time period (in the illustrated example 2 hours) commencing from a predetermined starting time (in the example, the starting time corresponds to a predetermined time—such as the time at the left most portion of the un-enlarged guide as illustrated in FIG. 7). It is also contemplated that the predetermined time could be a time commencing with a current time that is maintained within the device 10. As noted, the enlarged guide portion 30 may also contain programming information that is consumer-specified, such as programming information pertaining to consumer specified favorite channels (either commencing at a consumer-specified channel, including only those specified by a consumer, those determined to be most selected by a consumer, etc.) and/or user-specified favorite times.

For the purpose of demonstrating to the consumer that the device 10 is in zoom mode, i.e., the display is showing an enlarged portion of the program guide, the appearance of the icon 12 may be changed. By way of example, the icon 12 can be presented with a line through it to show an activated condition as illustrated by the icon 32 of FIG. 9. In this case, the icon in question acts as a toggle to switch in and out of zoom mode and thus the representation illustrated by 32 in FIG. 9 is used to indicate that the next activation of this icon will cancel the zoom mode. It is also contemplated that the color of the icon can be changed, the icon can be flashed, etc.

Figure 10:
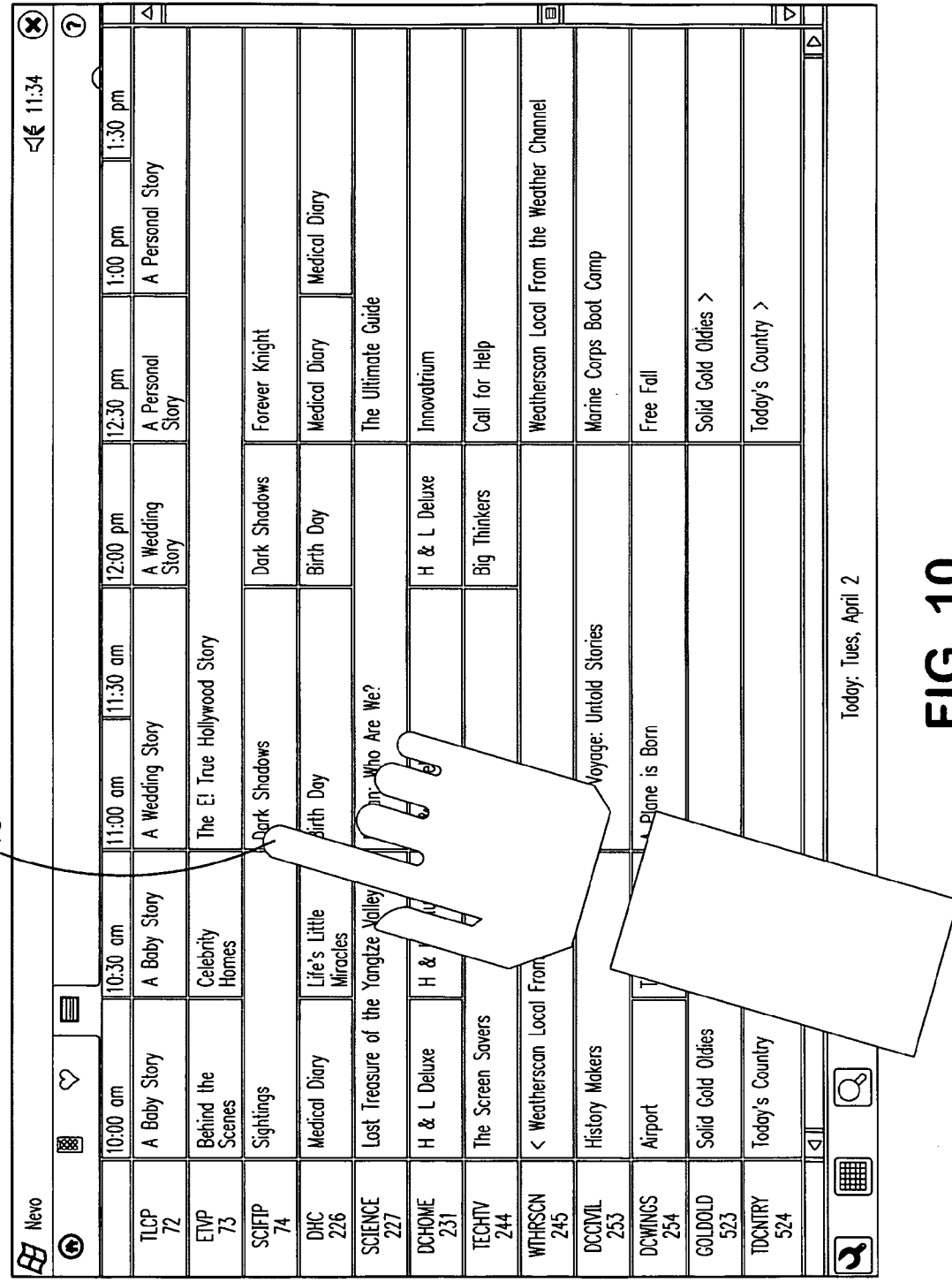

The programming information contained within the enlarged portion 30 of the program guide may also be determined based upon interaction with the un-enlarged program guide by the consumer. For example, the consumer may indicate a desire to enter the zoom mode (e.g., by touching the zoom icon which readies the device for zooming, which readiness may be indicated to the user by the display of an icon having a changed or changing appearance) followed by the consumer indicating a location within the un-enlarged program guide that the consumer wishes to have enlarged. The indication of the location may be provided by the consumer using the graphical user interface (e.g., touching a location on the display with a finger or stylus as illustrated in FIG. 10) to select a cell or area of cells of interest within the displayed un-enlarged guide, by moving the scroll bars, etc. Upon receiving the indication, the software causes appropriate programming information to be displayed in the enlarged portion 30 of the program guide. In the illustrated example, the touching of the "Dark Shadow" cell within the un-enlarged program guide may cause the enlarged portion 30 to present programming information that commences with channel 74 and time 11:00 am. It is to be understood that the user may navigate within the un-enlarged program guide to find channels and/or times of interest before performing the step of indicating which cell or cells should be enlarged. It will also be appreciated that this two step process, i.e., indicating a desire to enlarge the program guide followed by another user interaction with the device, can result in the display of predetermined information within the enlarged portion 30 as described above, e.g., favorites, programming information commencing with the channel and time in the upper left most corner of the displayed un-enlarged program guide, etc.

To change the programming information that is presented within the enlarged portion 30 of the program guide, the user can exit the zoom mode, by retouching the icon 32 for example, and then reinitiating the zoom feature at a different location within the un-enlarged program guide, for example, when a two-step process is utilized. Alternatively, the graphical user interface may be used in manner that indicates to the device that the user wishes to scroll the program guide within the enlarged display area 30 thus changing the portion of the program guide shown there within. This indication can be performed using standard GUI techniques such as associating scroll bars with the display of the enlarged portion 30, scrolling as a result of following the movement of a finger or stylus within the display, etc. In this manner, the consumer may conveniently navigate within the enlarged display portion 30 just as a consumer can navigate within the un-enlarged display portion.

Figure 11:
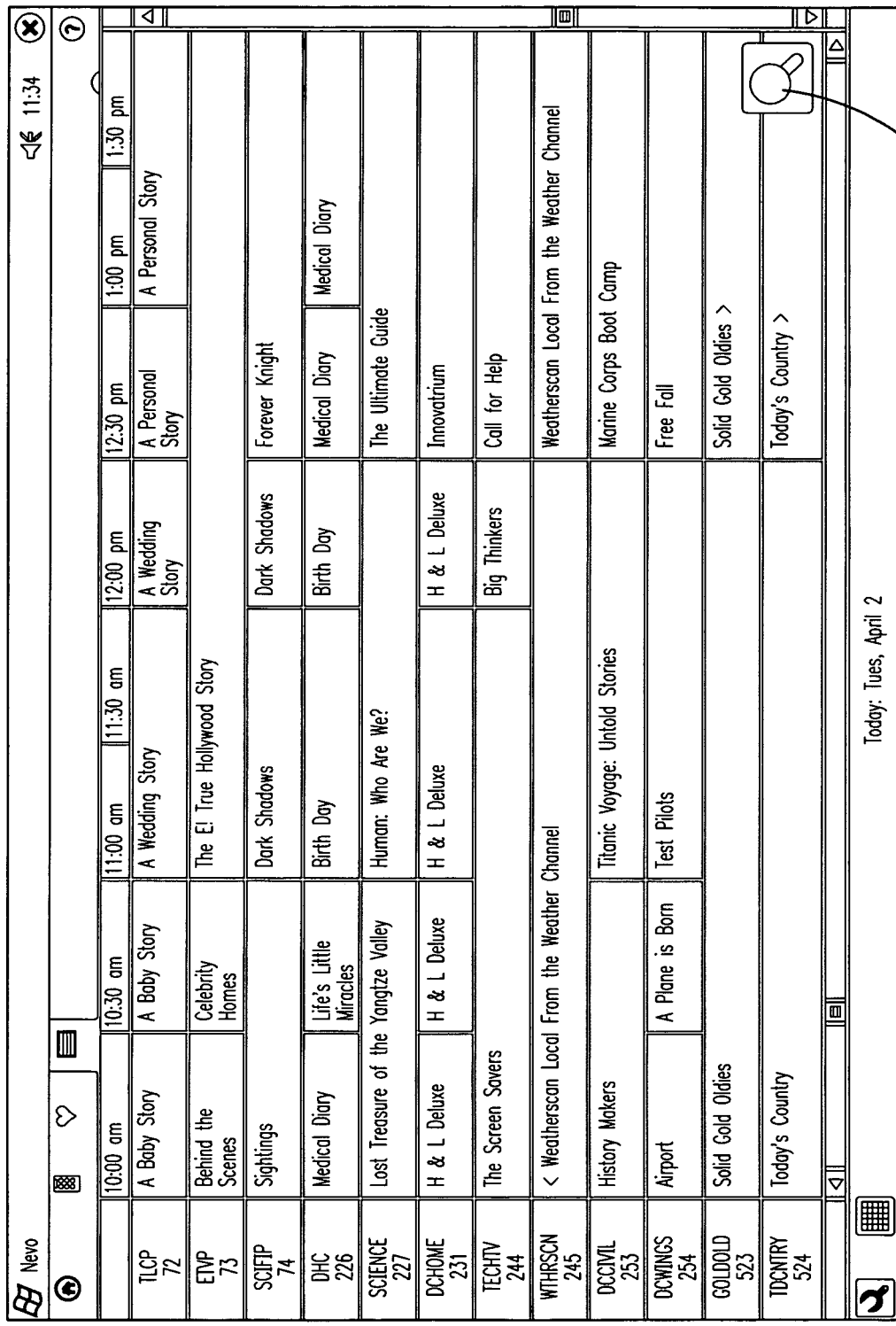

It is to be further understood that the zooming feature may also be used to present control function icons and/or other aspects of the graphical user interface in a larger, more prominent manner without limitation. An example of an enlarged icon is illustrated as icon 12 in FIG. 11.

Figure 12:
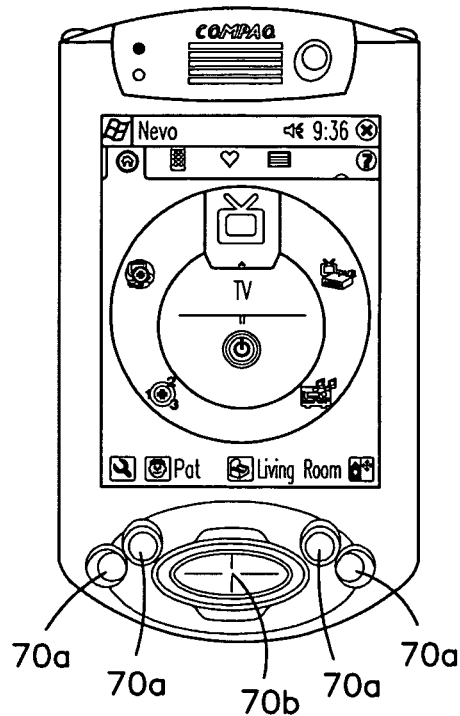
FIG. 12 illustrates an exemplary device platform having hard keys for use in transmitting command codes to one or more target appliances.
Figure 13:
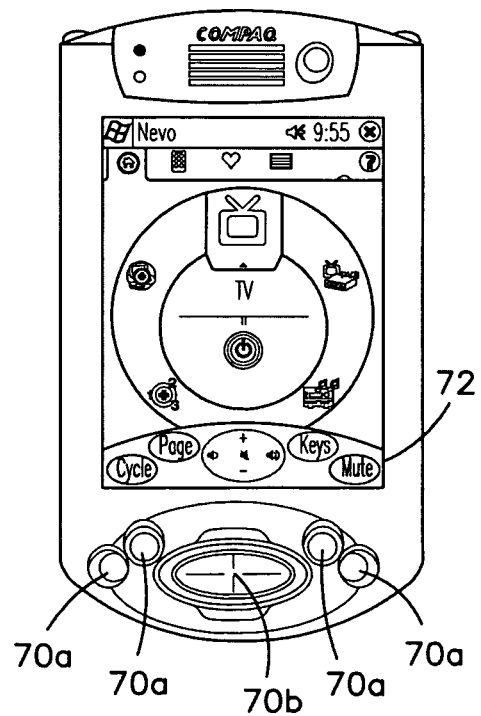
FIG. 13 illustrates an exemplary display for providing information relevant to the hard keys of FIG. 12.

To transmit command codes to an appliance (or perform local operations), a consumer may activate hard keys 70, for example, at the bottom of the device 10 in the exemplary platform illustrated in FIGS. 12 and 13. In this illustrated example, four individual buttons 70a and one 5-way rocker button 70b (4 directions plus a "press to select") comprise the hard keys 70. The remote control application allows commonly-used functions to be mapped onto the hard keys 70. For example, operations such as "Controls" (Volume, Channel +/−, mute), "Navigation" (directional arrows and select), or "Transport" (Play, fast forward, rewind, etc) can be mapped onto the keys 70. The current operations to be performed in response to activation of keys 70 can be presented in a display 72, shown in FIG. 13, for example, by pressing one of the hard keys 70 which is permanently assigned to the function of displaying key assignments. In the illustrated example, in the case of the illustrated platform, the display assignments key 70 is shown to be the upper one of the two right hand individual keys (labeled "keys" in the display 72).

Figure 14:
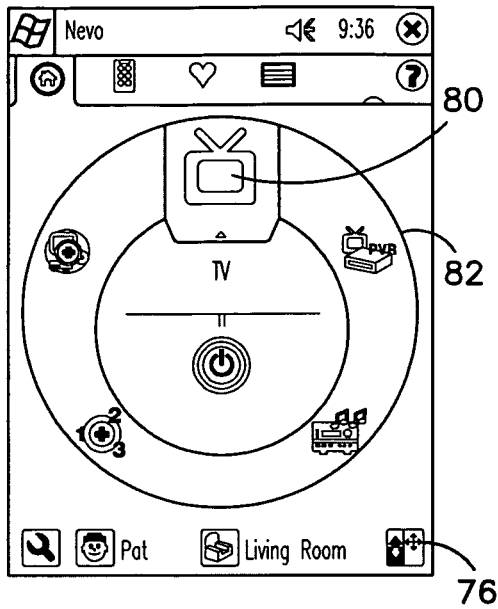
FIGS. 14-18 illustrate an exemplary graphical user interface method for configuring the hard keys of FIG. 12 to cause the transmission of commands to command the operation of one or more appliances.
Figure 15:
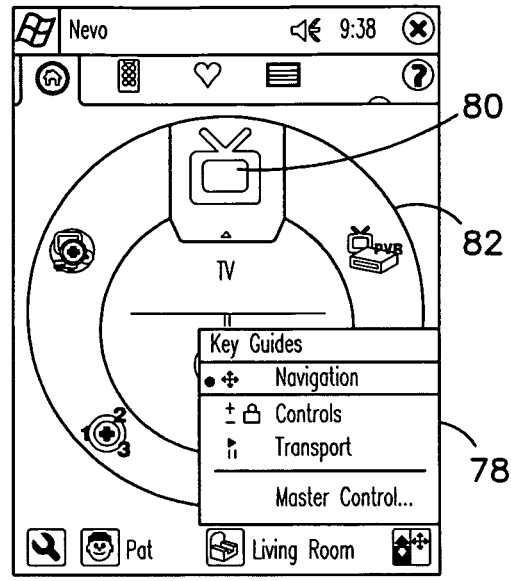

Referring now to FIG. 14, the operations assigned to the keys 70 can be changed by the consumer activating a command button, e.g., icon 76 shown at the lower right corner of the exemplary screen shot. Activation of the command icon 76 can be used to pop-up a menu 78, an example of which is illustrated in FIG. 15, by which the user may change the operations mapped to the keys 70. By way of illustration, the first three items on the menu correspond to the three possible assignments for the hard keys. e.g., the keys 70 may have operations mapped to them such that activation of the keys cause the device 10 to transmit command codes to command "navigation," "control" or "transport" functions of a target appliance. The fourth menu choice, "Master Control," allows the consumer to specify a specific target appliance to which any transmitted command codes are to be sent (i.e., the command codes are formatted so as to be understood by the target appliance). The default, in the absence of any user setup, can be to simply have the device 10 transmit command code signals in a format appropriate for a target appliance that has been designated for the current device mode of the platform, i.e., the device mode indicated by the icon 80 at the top of the device mode wheel 82. Selecting the "Master Control" item of the menu 78 may be used to start a Master Control Setup Wizard, an example of which is illustrated in FIGS. 16 and 17.

Figure 16:
Figure 17:
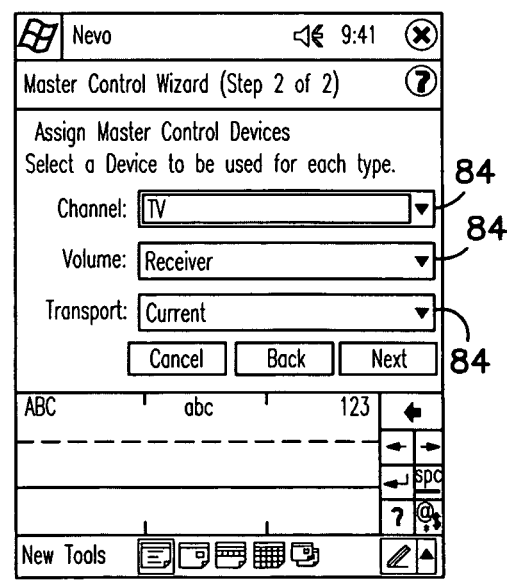
Figure 18:
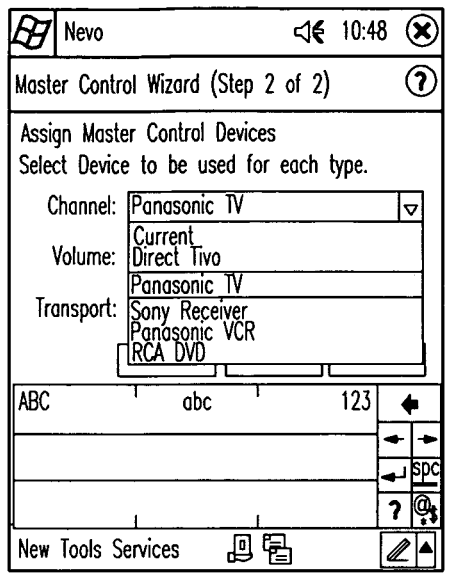

Turning to FIG. 16, the Master Control Setup Wizard may present to a consumer one or more drop-down lists 84 by which the consumer can select the target appliance for any transmitted command signals, e.g., signals to be used for each of channel changing, volume control, and transport functions. Preferably, the assignments performed using the Master Control Setup Wizard are only with respect to the hard keys 70. FIG. 18 shows an example drop-down list from which the user may select the target device for signals to command channel changing operations. While not intended to be limiting, the choices illustrated in FIG. 18 include only devices which have been set up by the user in connection with configuring the device mode wheel 82 (as described in U.S. application Ser. No. 60/334,774 which is incorporated herein by reference in its entirety, these are the appliances the device 10 has been setup to control the operation of).

Figure 19:
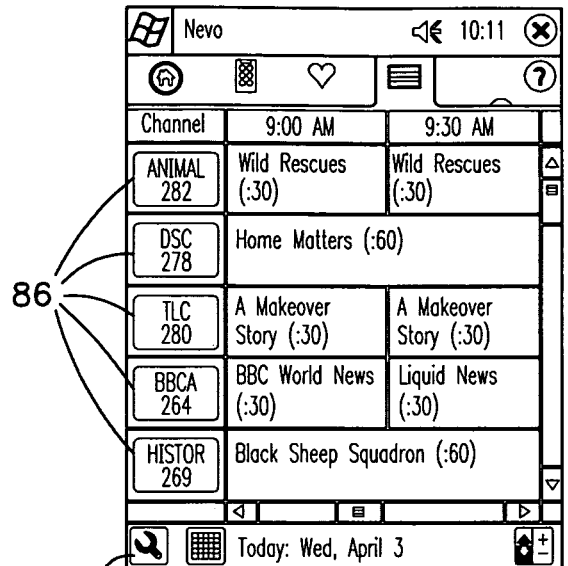
FIG. 19 illustrates an exemplary method for causing the transmission of commands to command the operation of one or more appliances via interaction with a program guide.

To transmit commands to tune a target appliance to a specified channel using a program guide, an example of which is illustrated in FIG. 19, a user need only select or activate a channel button 86 which, in the illustrated example, is a soft key in the leftmost column of the program guide grid. As noted previously, activation of a channel button 86 will cause the device 10 to transmit a command signal, for example using an IR protocol, to command the target appliance to switch to the selected channel. The channel number to tune to in response to activation of a channel button 86 is preferably pre-calculated at the time the guide is downloaded from a Web site, or the like. In this regard, the guide information is populated, for example, based on the zip code and service provider information submitted by the user when registering for the service as described in U.S. application Ser. No. 60/390,286 that is incorporated herein by reference in its entirety. Accordingly, in the illustrated example, activation of the "TLC" channel button in the downloaded program guide would send a command to cause the target appliance to tune to channel 280 which is the channel on which the specified service provider is known to carry TLC content.

Figure 20:
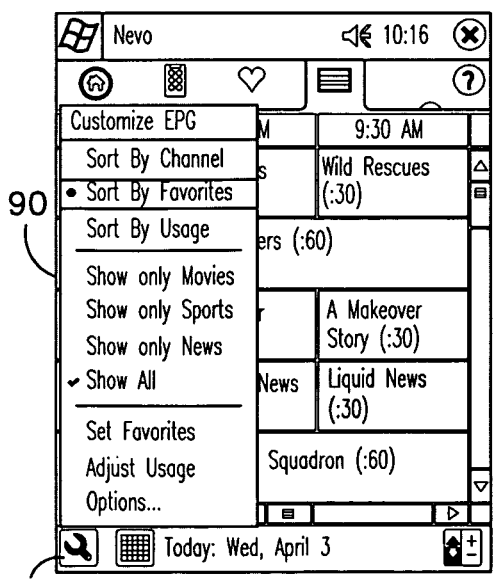
FIGS. 20-21 illustrate an exemplary method for configuring device transmissions in response to interaction with the program guide.
Figure 21:
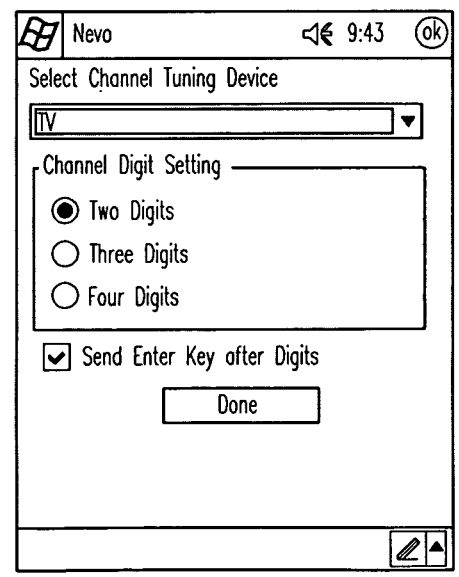

When transmitting a command to cause the appliance to tune to a specified channel, the default channel changing operation comprises sending the desired channel digits (a minimum of two, i.e., single digit numbers are prefixed with a leading zero) as a sequence of IR data commands in the format of the channel changing device specified in the Master Control Setup. Accordingly, the actual physical transmission of the sequence of commands is no different than playing back a user-programmed macro. The consumer may be provided, however, with the capability to adjust this default sequence described above if necessary to suit his particular equipment. Any such adjustment may be performed, for example, by touching a "setup" command button 88 (e.g., the wrench icon in the lower left corner of the guide display screen). Activation of the setup command button 88 can be used to present to the consumer a pop-up, setup menu 90 as illustrated in FIG. 20. As can be seen from the menu listings, among the setup choices can be provided a choice to allow the content of the program guide to be filtered and arranged for display. Furthermore, selecting a choice labeled "Options" can be used to invoke a configuration screen illustrated in FIG. 21.

Using the configuration screen, the consumer may change the master channel tuning device which may offer the same list of appliances and would affect the same parameter as the "Master Control Setup" wizard described earlier in connection with FIGS. 15-18. Additionally, the configuration screen can be used to allow a consumer to modify how the IR command sequence is to be constructed, i.e., allow the consumer to vary the minimum number of digits to be sent and to specify if an "enter" command is to be transmitted after the final digit is transmitted. (The "enter" function is mandatory for a few appliance brands, in others it is optional but often will speed up the channel changing response if used).

It will be appreciated that setup menus can also be provided to allow a consumer to specify a target device for command(s) transmitted by interacting with the program guide that need not be tied to the intended target appliance associated with the hard keys 70. Additionally, provision may be made for specifying multiple target appliances for use with the program guide. For example, when the platform is setup in a mode to command appliances in a first room, a first target appliance can be associated with the program guide and when the platform is setup in a mode to command appliances in a second room, a second target appliance can be specified to be associated with the program guide. Similarly, different target appliances can be specified to be the intended target for commands transmitted as a result of interacting with the program guide for each individual consumer setup to use the platform. Still further, if the program guide is adapted to show information from multiple sources, e.g., cable and satellite, different target appliances can be associated with different listing within the program guide as a function of the programming source.

While specific embodiments of the invention have been described in detail, it will be appreciated by those skilled in the art that various modifications and alternatives to those details could be developed in light of the overall teachings of the disclosure. For example, the programming grid need not be limited to channels being displayed in horizontal rows and times in columns. Rather, the principles expressed herein would be useful in connection with any manner for displaying program information that allows the information displayed to be changed or scrolled. Accordingly, the particular arrangement disclosed is meant to be illustrative only and not limiting as to the scope of the invention which is to be given the full breadth of the appended claims and any equivalents thereof.

All of the cited references are incorporated herein by reference in their entirety.

What is claimed is:

1. A method for controlling the operation of a plurality of consumer electronic devices, comprising:
   displaying a plurality of broadcast channel identifiers each corresponding to a broadcast channel each in a display of a controlling device adapted to command at least channel tuning operations of the plurality of consumer electronic devices, wherein the plurality of broadcast channel identifiers is comprised of at least one broadcast identifier associated with a first one of a plurality of appliances and at least one broadcast identifier associated with a second of a plurality of appliances different than the first one of the plurality of appliances;
   receiving first input into the controlling device that functions to designate one of the plurality of broadcast channel identifiers;
   receiving second input into the controlling device that functions to place the controlling device into one of a first controlling device operating mode and a second controlling device operating mode wherein in the first controlling device operating mode the controlling device is configured to transmit channel tuning commands to the first one of the plurality of consumer electronic devices using a first communication protocol and in the second controlling device operating mode the controlling device is configured to transmit channel tuning commands to the second one of the plurality of consumer electronic devices using a second communication protocol that is different than the first communication protocol; and
   using the first input and the second input to cause the controlling device to transmit a channel tuning command using a respective one of the first communication protocol and the second communication protocol to thereby cause a respective one of the first one of the plurality of consumer electronic devices and the second one of the plurality of consumer electronic devices to tune to the broadcast channel corresponding to the designated one of the plurality of broadcast channel identifiers.

2. The method as recited in claim 1, wherein program schedule information received via a network comprises the plurality of broadcast channel identifiers.

3. The method as recited in claim 2, wherein the program schedule information received via the network defines the broadcast channel corresponding to each of the plurality of broadcast channel identifiers.

4. The method as recited in claim 1, wherein third input provided to the controlling device defines the broadcast channel corresponding to each of the plurality of broadcast channel identifiers.

5. The method as recited in claim 1, wherein the first controlling device operating mode and the second controlling device operating mode each comprise a room operating mode which is indicative of a room in which the controlling device is currently being used.

6. The method as recited in claim 1, wherein the first controlling device operating mode and the second controlling device operating mode each comprise a user operating mode which is indicative of a user currently operating the controlling device.

7. The method as recited in claim 1, wherein at least one of the first communication protocol and the second communication protocol comprises an IR signal communication protocol.

8. The method as recited in claim 1, wherein at least one of the first communication protocol and the second communication protocol comprises an RF signal communication protocol.

9. The method as recited in claim 1, wherein the plurality of broadcast channel identifiers are provided as a part of program schedule information that is displayed in a touch screen of the controlling device.

10. The method as recited in claim 9, wherein the program schedule information is displayed in a grid of rows and columns in which each of the plurality of broadcast channel identifiers occupies a row in a first column in the grid and the programming information occupies further columns in the grid in the same row as its corresponding one of the plurality of broadcast channel identifiers with the programming information being further arranged as a function of time.

11. The method as recited in claim 10, wherein the first input designating one of the plurality of broadcast channel identifiers comprises a user interacting with the touch screen to select a row in the first column.

12. The method as recited in claim 1, wherein the channel tuning command is further constructed according to a user preference.

13. The method as recited in claim 12, wherein the user preference comprises requesting a transmission of an enter command as a part of the channel tuning command.

14. The method as recited in claim 12, wherein the user preference comprises specifying a minimum number of digit indicators to be included as a part of the channel tuning command.

15. The method as recited in claim 1, wherein the second input comprises a selection of a one of a plurality of controlling device mode input elements of the controlling device.

16. A method for controlling the operation of a plurality of consumer electronic devices, comprising:
displaying a plurality of broadcast channel identifiers each corresponding to a broadcast channel in a display of a controlling device adapted to command at least channel tuning operations of the plurality of consumer electronic devices, wherein the plurality of broadcast channel identifiers is comprised of at least one broadcast identifier originating from a first one of a plurality of broadcast service providers and at least one broadcast identifier originating from a second one of a plurality of broadcast service providers different than the first one of the plurality of broadcast service providers;
receiving first input into the controlling device that functions to designate a one of the plurality of broadcast channel identifiers; and
using the first input to cause the controlling device to transmit a channel tuning command to thereby cause a one of the plurality of consumer electronic devices to tune to the broadcast channel corresponding to the designated broadcast channel identifier;
wherein the controlling device uses a one of a plurality of different communication protocols that is associated with the one of the plurality of broadcast service providers from which the designated one of the plurality of broadcast channel identifiers originates when transmitting the channel tuning command and wherein the plurality of broadcast service providers comprises at least two different broadcast service providers selected from service providers of a cable service provider type and/or a satellite service provider type.

17. The method as recited in claim 16, wherein program schedule information received via a network comprises the plurality of broadcast channel identifiers.

18. The method as recited in claim 16, wherein second input provided to the controlling device defines the broadcast service providers that is associated with each of the plurality of broadcast channel identifiers.

19. The method as recited in claim 16, wherein at least one of the plurality of different communication protocols comprises an IR signal communication protocol.

20. The method as recited in claim 16, wherein at least one of the plurality of different communication protocols comprises an RF signal communication protocol.

21. The method as recited in claim 16, wherein the plurality of broadcast channel identifiers are provided as a part of program schedule information that is displayed in a touch screen of the controlling device.

22. The method as recited in claim 21, wherein the program schedule information is displayed in a grid of rows and columns in which each of the plurality of broadcast channel identifiers occupies a row in a first column in the grid and the programming information occupies further columns in the grid in the same row as its corresponding one of the plurality of broadcast channel identifiers with the programming information being further arranged as a function of time.

23. The method as recited in claim 22, wherein the first input comprises a user interacting with the touch screen to select a row in the first column.

24. The method as recited in claim 16, wherein the channel tuning command is further constructed according to a user preference.

25. The method as recited in claim 24, wherein the user preference comprises requesting a transmission of an enter command as a part of the channel tuning command.

26. The method as recited in claim 24, wherein the user preference comprises specifying a minimum number of digit indicators to be included as a part of the channel tuning command.

* * * * *